3,490,832
VISUAL ACUITY TESTING EQUIPMENT
Iwao Mitsuishi, 1–41 Kotake-cho, Nerima-ku, and Tadayoshi Akita, 436 Seijo-machi, Setagaya-ku, both of Tokyo, Japan
Filed Dec. 27, 1965, Ser. No. 516,444
Int. Cl. A61b 3/02
U.S. Cl. 351—30                               6 Claims

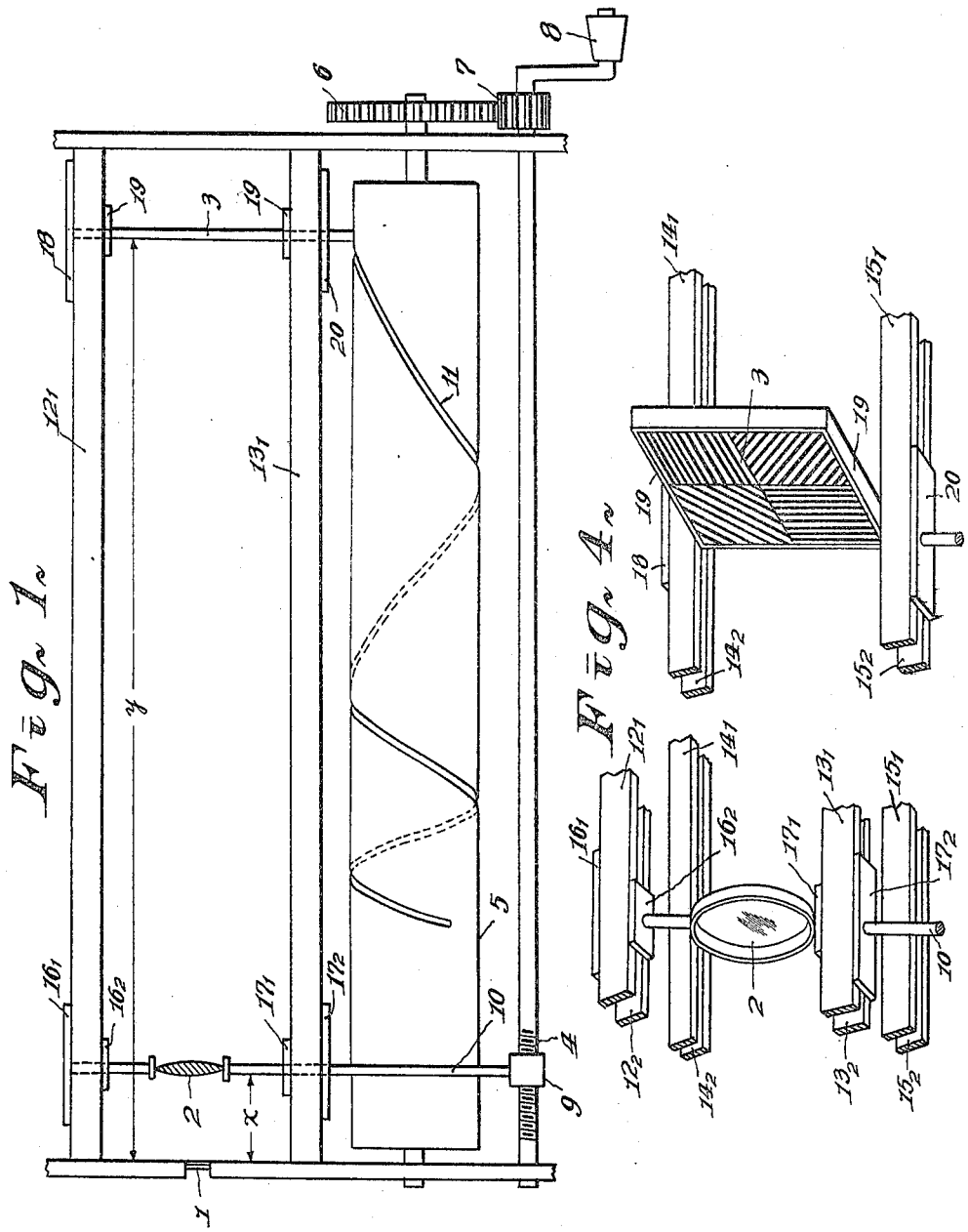

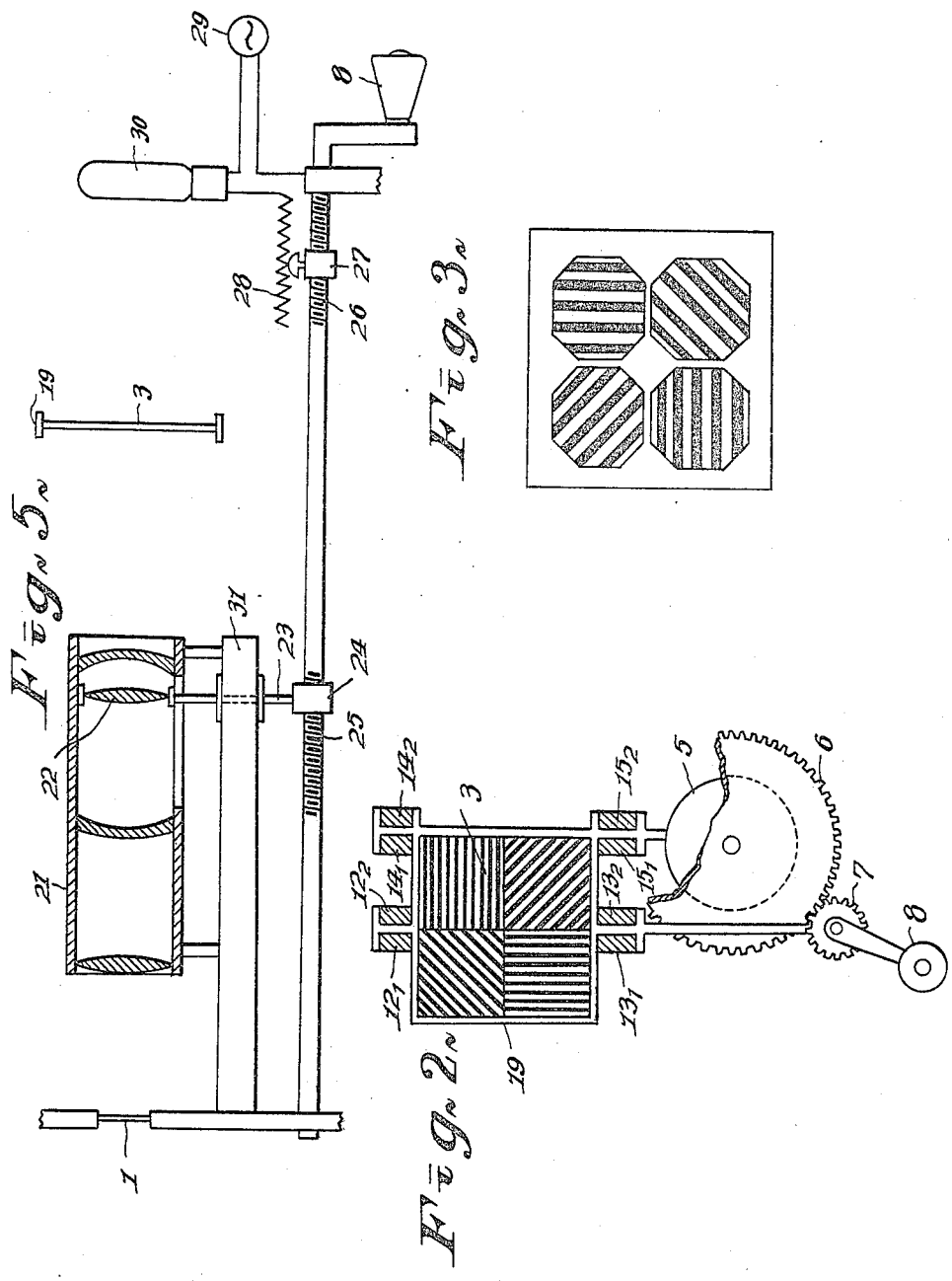

ABSTRACT OF THE DISCLOSURE

A device for measuring visual acuity is provided consisting of a pattern, a variable light source controlled by a rheostat, a zoom lens and a focusing screen, the zoom lens being positioned between the pattern and the focusing screen. The zoom lens and the rheostat controlled light source are adjustable by means of turn screws on a common shaft such that the intensity of the light on the screen remains substantially constant as the image size is varied.

---

This invention relates to a device based on the principle of observing at a certain distance a great number of parallel lines placed at equal intervals and to examine the visual acuity of an observer by determining a limit within which he can count the number of such parallel lines. Though the conventional visual testing methods are practical and convenient in that figures employed for observation are mainly letters and symbols, they cannot be termed the complete measuring method and in addition, the possibility of errors due to deciphering depending on memory or imagination is not always eliminated. In contrast thereto, the testing method based on the present invention is characteristic in that it is more closely related to the definition of visual acuity and further it: eliminates any room for intervention of memory or imagination.

It is well known that Landolt's ring is available as one of the representative conventional means of visual acuity testing. Landolt's ring visual target is a diagram comprising a group of large and small black rings partially broken and the part required for testing of visual acuity is the length of circular arc of said broken portion. That is to say, the mean value of radii of two large and small circles forming the rims of a ring and the difference between radii of two circles, etc. do not play any important role in the testing of visual acuity. In other words the solid part of ring is merely a means to form a broken portion. With respect to the original significance of visual testing, the white Landolt's ring visual target on a black background has the same value as the abovementioned black Landolt's rings. Even if it is supposed that such visual targets on which white rings on black backgrounds exist, the numerical values pertaining to the radii of two circles forming such a ring would not take any particular role. The present invention consists in visual acuity testing equipment which eliminates those portions of two types of the ordinary and reverse Landolt's ring visual targets being not important for visual acuity test and is composed of merely those portions assuming a role, that is, the broken portions. Under the present invention, the width of black lines forming close parallel lines is equal to the width of white lines lying between the black lines, which corresponds to the case of two types of Landolt's ring visual targets in which the widths of broken parts are equal to each other.

Also, in the case of Landolt's ring visual target, if a broken part were barely observed, the numerical value of visual acuity is employed as the value of visual acuity and accordingly, a visual acuity figure not measurable by the target cannot be measured without changing to another target or ring having a different visual acuity value. Under the present invention, the width of close parallel lines is changed successively and therefore, any acuity value can be obtained directly as a measured value without changing targets.

Also, as against Landolt's ring visual target which is not suited to the testing of astigmatism axis, the present invention is suited to such measurement. The axial direction of astigmatism varies in a range of 0°–180°. Consequently, if it is to be determined by means of Landolt's ring visual target, it is necessary to provide such a target in which the direction connecting a broken part with the center of ring has many different values between 0°–180°, which is practically impossible. However, under the present invention, the axial direction of astigmatism is measured by successively varying the direction of close parallel lines between 0°–180°.

As described above, the present invention is entirely different in its purpose and technical detail from the conventional Landolt's ring visual target, etc. and has special effects thereof which cannot be performed by Landolt's ring visual target; etc.

Referring now to the drawings which represent various preferred embodiments of the invention which does not require high degree of fabrication technique and can be manufactured at comparatively low cost and wherein the numerals refer to like parts is described below.

FIG. 1 is a side elevation illustrating the over-all internal structure of the first embodiment, FIG. 2 a sectional rear view of FIG. 1, FIG. 3 the corresponding front view, FIG. 4 an isometric view illustrating the sliding members of FIG. 1 and FIG. 5 the side view illustrating the over-all structure of the second embodiment.

In FIG. 1, 1 represents a focusing screen and the reai image of basic pattern 3 for visual test is formed on the focusing screen 1 by way of a convex lens 2. To maintain this image always sharp, there should exist the relation $y = x^2/(x-f)$ among the distance $x$ between the focusing screen 1 and the lens 2, the distance $y$ between the focusing screen 1 and the basic pattern 3 and the focal length $f$ of the lens 2. The mechanism consisting of feed screw 4, grooved cam 5, gear 6, pinion 7, etc. is intended for maintenance of such relationship. If the handwheel 8 in FIG. 2 is turned clockwise, female screw 9 is displaced to the left due to the rotation of screw 4 in FIG. 1, as a result of which the lens mount 10 with lens 2 on it moves to the left and decreases the value $x$. This turn of handwheel 8 causes anticlockwise rotation of gear 6, and the grooved cam 5 moves the basic pattern 3 to the right, thus increasing the value $y$. The groove 11 of cam 5 is so shaped as to satisfy the condition $y = x^2/(x-f)$. For the purpose of minimizing possible error from this relationship, the lens mount 10 holds two pairs of guide rails $12_1$, $12_2$ and $13_1$, $13_2$ by means of the sliding pieces $16_1$, $16_2$ and $17_1$, $17_2$ respectively whereas the supporting frame 19 of basic pattern 3 holds two pairs of guide rails $14_1$, $14_2$ and $15_1$, $15_2$ by means of the sliding pieces 18 and 20 respectively. The relation between the guide rails $12_1$, $12_2$, $13_1$, $13_2$, $14_1$, $14_2$, $15_1$, $15_2$ and the sliding pieces $16_1$, $16_2$, $17_1$, $17_2$, 18, 20 is also illustrated in FIG. 2 and FIG. 4. The basic pattern 3 is a figure, as illustrated in FIG. 2, consisting of 4 groups of close parallel lines forming an angle of 45° with each other, with the intervals of these 4 groups of parallel lines being all maintained equal. Accordingly, it is possible to detect directional visual acuity differences such as astigmatism due to the directional differences between the parallel lines on each group.

The close parallel lines of the basic pattern 3 are bright and dark thick lines of equal width arranged alternately, as by for instance, black lines drawn on a piece of frosted glass. Basic pattern having equal spacing between them is illuminated by means of a light source (not shown) placed to the right of FIG. 1 and the image is formed on the focusing screen 1 of FIG. 1 as illustrated in FIG. 3. That is to say, 4 groups of parallel lines are accommodated separately in 4 square-shaped windows lacking four corners. First, by turning the handwheel 8, parallel line intervals of the image shown in FIG. 3 are made very small and then, they are gradually increased by turning the handwheel in the opposite direction to bring about a condition in which the number of any one of the groups of parallel lines in the 4 squares can be barely counted, and visual acuity is obtained as a function of parallel line interval in such a case. If, in this case all of the lines in each of the 4 groups of parallel lines can be counted, it means that such eye can be determined as not having any astigmatic defects.

In the case of visual acuity testing, it is desirable that the illumination of the surface of the focusing screen does not change greatly. In the first embodiment of the present invention as illustrated in FIGS. 1 to 4, a rheostat is connected to the light source for illumination as is placed to the right of FIG. 1 (not shown), by which luminous intensity of the light source is adjusted to avoid excessive change of illumination in the image field on the focusing screen 1. If, in this embodiment, the focal length of lens 2 is set, for instance, at 10 cm. and the value $y$ is selected between 40 cm. and 121 cm., the range of visual acuity test can be made to fall within a scope of 1:10 like 0.1–1.0 or 0.2–2.0.

In the case of the second embodiment as illustrated in FIG. 5, a zoom lens 21 is employed instead of the lens 2 of FIG. 1, through which the basic pattern 3 is projected on to the focusing screen 1. In this second embodiment, the positions of both zoom lens 21 and basic pattern 3 are fixed and the size of image of the basic pattern 3 on the focusing screen 1 is varied only by means of movement of lens 22. That is to say, if the handwheel 8 as seen from the right is turned clockwise, the feed screw 25 feeds the female screw 24 to the left, as a result of which the lens 22 moves together with the lens mount 23 to the left. 31 is a guide rail similar to 12, 13, 14, 15 in FIG. 4. As the image of the basic pattern 3 on the focusing screen 1 is reduced according to movement of lens 22 to the left, the luminous intensity of the image field on the focusing screen 1 increases unless illumination of light source 30 for lighting is reduced. Since, however, turning the handwheel 8 causes the feed screw 26 to shift the female screw 27 with a sliding piece in the same direction as the female screw 24, the female screw 27 equipped with sliding piece moves to the left in cases where luminous intensity of image field of the basic pattern 3 on the focusing screen 1 is about to increase, and increases the resistance of the circuit comprising slide rheostat 28, light source 30 and current source 29, thus properly reducing the illumination of light source 30 and maintaining the luminous intensity on the focusing screen 1 approximately constant. The winding of slide rheostat 28 is done in such way that in the case of movement of the female screw 27 with the sliding piece, the luminous intensity on the focusing screen 1 remains unchanged.

As described above, the present invention consists of a visual acuity testing device comprising as its element the figure composed of plural groups of close parallel lines in mutually different directions and a device in which an appropriate figure is projected through a lens or lens system on to a semi-transparent plate, the length to be an element for visual test being the spacing of close parallel lines appearing in said projected image which is changed successively and, by making a subject observe it, visual acuity is tested. This is accordingly, different from conventional visual acuity testing methods in which a figure for observation mainly consists of letters, symbols etc. and for this reason, deciphering errors due to memory or imagination are apt to be produced. The present invention has features not to be found in the conventional ones in that it is more closely related to the definition of visual acuity and accordingly leaves no room for intervention of memory or imagination in case of deciphering to ensure complete, accurate and easy testing of various types of visual acuity. The equipment can also be easily manufactured by means of comparatively simple machining techniques.

What we claim is:

1. A device for testing visual acuity comprising: a focusing screen, a zoom lens, a transparent pattern having a plurality of equal width light and dark parallel lines thereon, and light source means for projecting said pattern on said screen via said zoom lens, said zoom lens comprising moveable lens means therein moveable toward and away from said pattern for varying the width of said light and dark parallel lines on said screen without changing the focus of the image on said screen, said pattern being positionally fixed relative to said screen, and screw means for moving said lens toward and away from said pattern, further comprising means for adjusting the intensity of said light source conjointly with movement of said lens while keeping the illumination intensity of said lines on said screen substantially constant, said adjusting means comprising a rheostat and a slider, said slider being mounted to said screw means and displaceable along the axis of said screw means in response to rotation of said screw means in predetermined relation to the movement of said lens.

2. A device as in claim 1 wherein said pattern has four groups of said equal width light and dark lines, each of said groups being at a 45° angle with respect to its adjacent group.

3. A device as in claim 2 wherein said focusing screen is composed of four separate focusing screens, one for each of said groups.

4. In a visual acuity measuring apparatus having a focusing screen, a light source, a lens, and a transparent pattern therein, said pattern being projected on said screen via said lens by said light source, at least a portion of said lens comprising moveable lens means for varying the size of the image projected on said screen while keeping said image in focus on said screen, the improvement comprising: means for adjusting the intensity of said light source conjointly with movement of said lens to change the image size on said screen whereby the illumination intensity of said image on said screen is kept constant and further providing collar means for holding and moveably mounting on a rotatable screw shaft whereby rotation of said screw shaft moves said lens and further comprising slide rheostat means connected to said light source, said slide means moveable in relation to rotation of said screw shaft for varying the intensity of said light source.

5. A visual acuity measuring device as in claim 4 wherein said pattern is moveable, said pattern being moved by rotation of a cam shaft in predetermined relation to the movement of said lens.

6. A device for testing visual acuity comprising: a focusing screen, a zoom lens, a transparent pattern, and light source means for projecting said pattern on said screen via said zoom lens, said zoom lens having moveable lens means therein moveable toward and away from said pattern, for varying the pattern on said screen without changing the focus of the image on said screen, said pattern being positionally fixed relative to said screen, and screw means for moving said lens toward and away from said pattern, means for adjusting the intensity of said light source conjointly with movement of said lens while keeping the illumination intensity of said pattern on said screen substantially constant, said adjusting means comprising a rheostat and a slider, said slider being mounted to said screw means and displaceable along the axis of said screw means in response to rotation of said screw means in predetermined relation to the movement of said lens.

References Cited

UNITED STATES PATENTS

| | | | |
|---|---|---|---|
| 1,645,367 | 10/1927 | August | 355—58 |
| 2,737,081 | 3/1956 | Dowling | 353—101 |
| 1,174,547 | 3/1916 | Clason | 351—30 |
| 1,369,136 | 2/1921 | Shigon | 351—34 |
| 2,036,181 | 3/1936 | Mendelsohn et al. | 351—17 |
| 2,184,507 | 12/1939 | Jobe | 351—30 |

FOREIGN PATENTS 910,433 6/1946 France.

DAVID SCHONBERG, Primary Examiner

P. A. SACHER, Assistant Examiner

U.S. Cl. X.R.

351—32, 36

UNITED STATES PATENT OFFICE
CERTIFICATE OF CORRECTION

Patent No. 3,490,832          Dated January 20, 1970

Inventor(s)   Iwao Mitsuishi and Tadayoshi Akita

It is certified that error appears in the above-identified patent and that said Letters Patent are hereby corrected as shown below:

Col. 2, Line 23: "etc." should be omitted

Col. 3, Line 2: "(0)" omitted after "Basic pattern"

Col. 3, Line 24: "as is" should read --and is--

Col. 4, Line 51 (Claim 4): "said lens" omitted after "mounting

SIGNED AND
SEALED
JUL 21 1970

(SEAL)
Attest:

Edward M. Fletcher, Jr.
Attesting Officer

WILLIAM E. SCHUYLER, JR.
Commissioner of Patents